United States Patent Office 3,733,391
Patented May 15, 1973

3,733,391
PROCESS OF PREPARING HIGH SILICA FAUJASITE
George W. Hoffman, Houston, Tex., asisgnor to NL Industries, Inc., New York, N.Y.
No Drawing. Continuation-in-part of application Ser. No. 784,230, Dec. 16, 1968. This application Nov. 1, 1971, Ser. No. 194,489
Int. Cl. C01b 33/28
U.S. Cl. 423—118                                    12 Claims

ABSTRACT OF THE DISCLOSURE

Synthetic faujasite having a $SiO_2/Al_2O_3$ mol ratio of at least 3.5 is produced by acid leaching calcined kaolin clay to a $SiO_2/Al_2O_3$ mol ratio within the range of about 4 to 10, washing the acid leached clay until substantially free of acid, commingling the clay with sodium hydroxide and water in specified mole ratios of $Na_2O$, $Al_2O_3$, $SiO_2$, and $H_2O$, optionally aging the reaction mixture at a temperature in the range of about 20° C. to 35° C., and thereafter heating the reaction mixture to a temperature in the range of about 95° C. to 105° C. until the desired degree of formation of faujasite has taken place. Delaminated kaolin clay is preferred. Optionally, fluoride ions are added to the reaction mixture to increase the $SiO_2/Al_2O_3$ mol ratio of the faujasite product. Also, optionally, the calcined kaolin clay is acid leached to a $SiO_2/Al_2O_3$ mol ratio in the range of about 10 to 50 and sodium hydroxide added to the clay-acid leach mixture to raise the pH thereof so as to reprecipitate some of the alumina to produce a clay having a $SiO_2/Al_2O_3$ mol ratio in the range of about 4 to 10 prior to washing the acid-leached clay.

---

This application is a continuation-in-part of my co-pending application, Ser. No. 784,230, filed Dec. 16, 1968, now abandoned.

This invention relates to the production of high silica faujasite, having a silica-to-alumina ratio of at least 3.5, and this including a portion of the range of what is sometimes called type Y faujasite.

The zeolite minerals are a family of aluminosilicates, of which the majority of members exhibit a fairly open framework bearing an inherent negative charge, electrostatically balanced by cations not part of the lattice proper. Those with accessible channels within the lattice have come to be known as molecular sieves, as suggested by McBain some 40 years ago.

Because of the manifold industrial uses of various of the zeolites, their synthesis, generally by hydrothermal means, was successfully developed by the turn of the century, and now includes many of the naturally occurring mineral species. Among the latter, an important member is faujasite, a rare mineral having type occurrences in Germany, notably in the Kaiserstuhl near Freiburg. This particular occurrence shows a silica-alumina ratio of about 4.3. (Expressed on a molar basis throughout this specification and claims.)

Apparently because of the very open framework of faujasite of the type just described, it is difficult to synthesize, especially at yields high enough to make commercial production economic. Some of the procedures given in the patent literature for preparing faujasite of this kind are disappointing, since when they are carried out, relatively low silica-to-alumina ratios are obtained, or even in many cases a more stable zeolite species such as phillipsite results instead.

Using procedures found in the literature, a whole series of faujasites can be made having any desired silica-to-alumina ratio from as low as about 2 to as high as about 6. Since the same crystal structure is present in all of these, dimensional variations aside, they are properly all referred to an faujasite, but in order to characterize them it is necessary to specify the silica-alumina ratio. Thus, they have been termed high and low silica faujasites, as for example in the paper by Wright et al., American Mineralogist 53, 1293–1303 (1968).

An object of the present invention is to provide a process for producing faujasite having a silica-to-alumina ratio of at least 3.5, and generally within the range of 4 to 6, using readily available raw materials and operating under conditions which are readily obtainable in practice.

Other objects of the invention will appear as the description thereof proceeds.

Generally speaking, and in accordance with illustrative embodiment of my invention, I first calcine kaolin so as to transform it into metakaolin, which is readily accomplished by heating to 1250° F. to 1450° F. for about a quarter to one hour. Ordinarily 1300° F. and 15 minutes suffice. The conversion can readily be checked by standard X-ray methods. Normally the product will have a silica/alumina ratio of about 1.85 to about 1.95. It is of course possible to purchase metakaolin in which the heating has been done by the primary supplier.

The kaolin may be any member of the kaolin family, preferably kaolinite or halloysite. The former is widely available at low cost and at high purity, and is preferred. It may be employed as good quality mine-run material, but somewhat better results are obtained if it has been processed to more or less break up the aggregates of elementary platelets which occur in "book" form in the natural clay. Such processed kaolin is commonly termed "delaminated." Many methods are available for delamination, generally involving a high intensity mechanical shear or rupturing action. Thus a slurry of the clay may be passed through a mill of the type described in Cross Pat. 2,044,757; or a paste of the clay may be extruded as taught in Lyons Pat. 2,904,267. The beneficial effects of delamination are retained upon conversion to metakaolin, so that the latter can likewise be termed delaminated metakaolin.

The metakaolin is then treated with aqueous acid, which preferentially dissolves out alumina, thus increasing the silica/alumina ratio. The time, concentration and temperature of the acid leach are not critical. Less drastic conditions take more time. In any case, the progress of the acid leaching step is followed by taking samples from time to time, stopping the leaching when the silica/alumina ratio is within the range of about four to ten, and preferably within the range of six to eight.

Any strong acid may be used, such as sulfuric, hydrochloric, or nitric. I prefer sulfuric, since it works as well as any of the others, and is inexpensive and readily handled.

Typically, the metakaolin is added to a 10% to 20% acid solution in water, with a clay/sulfuric acid weight ratio of about ½:1 to 1:1, and heated to 150° F. to 212° F., until the desired mol ratio is achieved, which depending upon temperature and acid concentration normally ranges from 1 to 2 hours.

When the desired amount of alumina has been leached from the metakaolin, the slurry is then filtered, preferably while hot, and the filter cake washed until free of acid.

The acid leached and filtered and washed clay material may be dried if desired, although this is not necessary and merely increases treatment costs.

Next, the clay material treated as above is formed into a reaction mixture with sodium hydroxide and enough water to form a paste or slurry. Optionally, sodium fluoride may be included in the reaction mixture, and again optionally, the reaction mixture may be seeded with faujasite already on hand. The proportions of the several constituents of the reaction mixture are given in the table which follows:

TABLE 1

| Proportions | Operable | Preferred |
|---|---|---|
| $Na_2O/Al_2O_3$ | 1.6–8 | 2.4– |
| $SiO_2/Al_2O_3$ | 4–10 | 6–8 |
| $H_2O/Al_2O_3$ | 24–185 | 36–80 |
| Zeolite seed, percent | [1] 0–5 | 2. |
| $F^-/SiO_2$ | 0–0.2 | 0.1 |

[1] By weight solids (all other figures are mol ratios).

In a preferred procedure in accordance with the invention, the temperature of the newly formed reaction mixture is initially maintained at between 30° C. and 40° C., and preferably within the range of 32° C. to 35° C. This is best accomplished by separately dissolving the caustic soda and sodium fluoride, if used, in at least some of the water to be used and allowing this solution to cool to room temperature.

The treated clay, together with the seed crystals, if used, are then added slowly over a period of about half an hour, not permitting the temperature to rise above the preferred range, and applying external cooling if needed. I have found that if the reaction mixture at this step is allowed substantially to exceed about 40° C., phillipsite instead of faujasite may result. Any mixing to produce uniformity should be gentle.

A useful but optional step in the inventive process, the reaction mixture having been formed, is to age the reaction mixture, which is done by holding the reaction mixture within the range of 20° C. to 35° C. for a period of time, which may be up to about 18 and even as much as 48 hours. For the aging step, it is convenient to place the reaction mixture in sealed containers, to prevent loss of water by evaporation and absorption of carbon dioxide from the air. If this aging step is omitted, the inclusion of seed faujasite is particularly beneficial, and as far as I have been able to determine, indispensible. Accordingly, when the aging step is omitted, I employ at least about 1/10% by weight of total solids of seed faujasite, and preferably the larger amounts already set forth.

The next step consists of heating the slurry, again best in sealed containers, within the range of 80° C. to 105° C. and maintaining the mixture at this temperature until the desired conversion to faujasite has taken place, which will be within the range of 8 to 24 hours, and more generally 10 to 20 hours. The rate of bringing the slurry up to temperature is found to have an effect on the yield of faujasite. The heating should be accomplished within an hour, and preferably 15 to 20 minutes for best results.

When sampling of the heated reaction mixture shows that the desired conversion has taken place, and this is conveniently and readily checked by X-ray diffraction, then it is cooled to approximately room temperature, and preferably to not above 40° C., which again should be carried out rapidly, as for example in at least one hour and preferably about 20 minutes.

The next step is to filter the reaction mixture and wash to a final pH of 10½ to 11. Depending upon the processing variables employed, a good yield, for example from 30% to 80% by weight of reaction product solids, will consist of high silica faujasite, having a silica-alumina ratio within the limits already mentioned, and readily approximating that of the natural Kaiserstuhl mineral.

Some illustrative working examples will now be given:

EXAMPLE NO. 1

A 320-gm. sample of commercial grade kaolin which had been calcined at 1300° F., to produce no traces of residual kaolin, was slurried with 3200 gm. of 20% sulfuric acid. The slurry was heated to 180° F. with agitation and held at that temperature for 65 minutes. The slurry was then filtered and the dried cake was analyzed and found to have an $SiO_2/Al_2O_3$ mol ratio of 5.8 and the ignition loss was 6.8%.

To 65.0 gm. of water, 23.7 gm. of flake caustic soda (76% $Na_2O$) was added. The caustic soda was dissolved and the solution cooled to below 90° F. The solution was placed in an ice bath at 65° F. and 60.0 gm. of the acid washed clay was added with mild agitation. The temperature was maintained below 90° F. during the mixing. The paste was then placed in containers and sealed. The paste was digested at room temperature with no agitation for 48 hours. The containers were then placed in an oven at 200° F. for crystallization.

At 30 hours a sample was removed. The slurry was filtered and washed and determined to be more than 50% crystalline faujasite with an $SiO_2/Al_2O_3$ mol ratio of 3.65. The feed composition mol ratios were:

$SiO_2/Al_2O_3$ _____ 5.8
$Na_2O/SiO_2$ _____ 0.40
$H_2O/Na_2O$ _____ 14

EXAMPLE NO. 2

A sample of acid-washed meta-kaolin was prepared as in Example No. 1. The $SiO_2/Al_2O_3$ mol ratio was 5.90; the ignition loss was 4.4%.

To 140.0 gm. of water, 46.0 gm. of flake caustic (76% $Na_2O$) and 7.5 gm. of sodium fluoride (96%) were added and the solution was cooled to 60° F. The solution was placed in an ice bath and 130.0 gm. of the acid-washed clay was added with mild agitation. The temperature during mixing was maintained at 60° F. The paste was placed in containers, sealed and allowed to digest for 42 hours at room temperature with no agitation.

The containers were placed in an oven at 208° F. for crystallization. A sample taken at 42 hours showed a 70% conversion to faujisite with an $SiO_2/Al_2O_3$ mol ratio of 4.31. The feed composition mol ratios were:

$SiO_2/Al_2O_3$ _____ 5.90
$Na_2O/SiO_2$ _____ 0.40
$H_2O/Na_2O$ _____ 13.0
$F^-/SiO_2$ _____ 0.1

EXAMPLE NO. 3

A sample of the same acid-washed clay as was used in Example No. 2 was used in this experiment to show the effect of not cooling during feed mixing.

To 140.0 gm. of water, 46.0 gm. of flake caustic (76% $Na_2O$) and 7.5 gm. of sodium fluoride (96%) were added with agitation. No attempt was made to cool the solution. Then 130.0 gm. of the acid-washed clay was added with mild agitation. The temperature of the slurry rose to 130° F. The slurry was placed in containers and the containers were sealed and allowed to digest at room temperature, with no agitation, for 42 hours.

The containers were then placed in an oven at 208° F. for crystallization. At 42 hours a sample showed 50% crystalline faujasite with an $SiO_2/Al_2O_3$ mol ratio of 4.15. The feed composition mol ratios were:

$SiO_2/Al_2O_3$ _____ 5.90
$Na_2O/SiO_2$ _____ 0.40
$H_2O/Na_2O$ _____ 13.0
$F^-/SiO_2$ _____ 0.1

EXAMPLE NO. 4

A sample of the same acid-washed clay as used in Examples 2 and 3 was used in this experiment to show the effect of seeding.

To 140.0 gm. of water, 52.6 gm. of flake caustic (76% $Na_2O$) was added and the solution was cooled to 60° F. The solution was placed in an ice bath and 130.0 gm. of the acid-washed clay and 7.5 gm. of synthetic faujasite seed from an earlier run were added with mild agitation. The paste was maintained at 60° F. during mixing. The paste was placed in containers and the containers sealed. The material was then digested for 42 hours at room temperature with no agitation.

The containers were then placed in an oven at 208° F. for crystallization. A sample taken at 18 hours had a crystalline faujasite content of 70% with an $SiO_2/Al_2O_3$ mol ratio of 3.75. A sample taken at 42 hours had a crystalline faujasite content of 65% with an $SiO_2/Al_2O_3$ mol ratio of 3.73. The feed composition mol ratios were:

| | |
|---|---|
| $SiO_2/Al_2O_3$ | 5.90 |
| $Na_2O/SiO_2$ | 0.40 |
| $H_2O/Na_2O$ | 13.0 |
| Seed | 4.5% |

EXAMPLE NO. 5

A sample of commercial delaminated kaolin was calcined at 1300° F. for five minutes. The calcined clay had a residual kaolin content of less than 5%, as determined by X-ray diffraction.

To 270 lb. of 25% sulfuric acid at 180° F., 30 lb. of the calcined clay was added with agitation. The slurry was refluxed for 15 minutes, then pumped through a filter press and followed with water to remove excess acid. The cake was analyzed and determined to have an $SiO_2/Al_2O_3$ ratio of 6.60.

To 10.21 lb. of liquid caustic soda (50% $Na_2O$), 0.840 lb. of sodium fluoride (99%) was added. Then 44.0 lb. of the filter cake from the acid-washed clay containing 17.4 lb. of clay on an ignited basis, and 0.41 lb. of faujasite seed were added with mild agitation. The slurry was maintained at 85° F.–90° F. during mixing. The slurry was then placed into containers and the containers were sealed. The material was digested for 24 hours at room temperature with no agitation.

The containers were then placed in a sand and mineral oil bath at 210° F. At 15½ hours the material was cooled, washed and filtered. The dried product was determined by X-ray analysis to be 39% crystalline faujasite with an $SiO_2/Al_2O_3$ mol ratio of 4.77. The feed composition ratios were:

| | |
|---|---|
| $SiO_2/Al_2O_3$ | 6.60 |
| $Na_2O/SiO_2$ | 0.45 |
| $H_2O/Na_2O$ | 19.3 |
| $F^-/SiO_2$ | 0.096 |
| Seed | 1.75% |

EXAMPLE NO. 6

A 250-gm. sample of calcined delaminated kaolin (as in Example No. 5) was slurried in 2250 gm. of 20% sulfuric acid. The slurry was heated to reflux for five hours, then cooled. Caustic solution was added to bring the pH of the slurry to 3.05. The slurry was then filtered and the cake washed. The $SiO_2/Al_2O_3$ mol ratio of the material was 5.70.

To 100.0 gm. of water, 63.5 gm. of flake caustic (76% $Na_2O$) and 8.2 gm. of sodium fluoride (96%) were added. The solution was not cooled. Then 220 gm. of the filter cake containing 149 gm. of the clay and 4.0 gm. of synthetic faujasite were added with high shear in a Waring Blendor. The temperature of the slurry rose to 130° F. The slurry was placed in containers and the containers were sealed. The slurry was digested at room temperature for 24 hours with no agitation.

The containers were placed in an oven at 208° F. A sample taken at 19 hours was determined to be 70% crystalline faujasite with an $SiO_2/Al_2O_3$ mol ratio of 5.13. The feed compositions were:

| | |
|---|---|
| $SiO_2/Al_2O_3$ | 5.7 |
| $Na_2O/SiO_2$ | 0.47 |
| $H_2O/Na_2O$ | 12.0 |
| $F^-/SiO_2$ | 0.098 |
| Seed ---percent | 1.9 |

EXAMPLE 7

Halloysite from Wagon Wheel Gap, Colo., was ground and calcined at 1300° F. for a period of 3 hours. The sample was then acid leached with sulfuric acid as before to remove a portion of the alumina. The $SiO_2/Al_2O_3$ mol ratio of the leached clay was 6.5. A reaction mixture was prepared using this material and the same techniques as described in Example 2 above. The $Na_2O/SiO_2$ mol ratio was 0.40. The $F^-/SiO_2$ mol ratio was 0.10. The material was reacted at 208° F. and yielded synthetic faujasite with a $SiO_2/Al_2O_3$ mol ratio of 4.30. The amount of crystalline material present was approximately 45%.

EXAMPLE 8

Acid-leached metakaolin as in Example 5, and having a $SiO_2/Al_2O_3$ ratio of 6.0, was made into a reaction mixture as follows:

| | Parts by weight |
|---|---|
| Acid-leached clay | 58.3 |
| NaOH | 14.5 |
| NaF | 0.98 |
| Seed faujasite | 1.38 |

Water was added to give an $H_2O/Al_2O_3$ molar ratio of 118. The $Na_2O/Al_2O_3$ ratio was 2.7, the $F/SiO_2$ ratio was 0.1, and the weight percentage of seed faujasite was 1.83.

As soon as the reaction mixture was prepared, it was rapidly heated to 95° C.–98° C. and maintained at that temperature for 16 hours. It was then cooled to room temperature, filtered, and washed with deionized water. The product was examined by X-ray diffraction, and found to have an $SiO_2/Al_2O_3$ ratio of 4.50, and exhibited a crystallinity of 50.0%.

The foregoing examples are illustrative of several aspects of my invention. Thus, Example 1 shows a relatively simple procedure, starting with ordinary commercial kaolin, and not using fluoride ion or seed crystals.

Example 2 illustrates the use of fluoride ion in the reaction mixture. Comparison with Example 1 shows an improvement in the silica/alumina ratio, in the sense of having a higher value.

Example 3 shows the undesirable effects which may ensue upon permitting the temperature of the reaction mixture to rise above the preferred limits which have been stated hereinabove. Comparing Example 3 with Example 2 shows a yield of only 50% instead of 70% and a lowering of the silica/alumina ratio.

Example 4 may be compared with Example 1 and shows the speeding up of the crystallization process by the use of faujasite seed crystals. It may be noted that after an optimum yield has been achieved, allowing the mixture to remain at the elevated processing temperature brings about a regression, in that some of the faujasite disappears and that remaining shows a slightly lower silica/alumina ratio.

Example 5 illustrates the use of a commercial delaminated kaolin as compared to the ordinary commercial kaolin used in the earlier examples, and in a larger-size batch.

Example 6 illustrates a variation in technique, in which an additional step is introduced between the step of leaching the clay with acid and the step of filtering and washing the acid-treated clay. This step comprises adding sufficient caustic alkali to the mixture of clay and aqueous acid, after the acid has had time to perform the desired leaching of alumina, to reprecipitate some of the alumina back on to the clay particles. This is done by adding a suitable alkali such as sodium hydroxide to raise the pH of the slurry. The reprecipitation is quite rapid. After the pH has been so raised, the clay is then filtered and washed before. It will be appreciated that in order to have a resulting washed clay with a silica-to-alumina mol ratio within the preferred range of 4 to 10, it is desirable to allow the acid to act for a time longer than usual. Indeed, when utilizing this additional step, I find it best to acid-leach until the silica-alumina ratio in the resulting clay is within the range of about 10 to 50 or even more. It will be appreciated that this results in a drastic leaching of alumina, but since alumina is promptly precipitated back onto the clay skeleton, the overall results are beneficial rather than otherwise. First of all, it may be observed that the deleterious effect of not cooling during the step of mixing the reactants, and the sensitivity to high shear mixing are overcome by employing this processing modification. Moreover, Example 6 shows the production of faujasite having the remarkably high silica/alumina mol ratio of 5.13, much higher indeed than the natural material, and at a 70% yield. This represents an even more remarkable advance over the prior art.

Any alkalizing agent may be used as long as it forms a water-soluble salt with the acid used in the previous step. If that acid is hydrochloric, then sodium, calcium, magnesium, lithium, or potassium hydroxide may be used. If the acid is sulfuric, then all of these except calcium hydroxide are suitable, calcium sulfate being non-water-soluble.

Example 7 shows the use of halloysite instead of kaolinite for the kaolin clay. A product was obtained having a mol ratio close to that of the natural product, although at a less favorable yield than ordinarily achieved when kaolinite is used.

Example 8 shows the operation of the invention omitting the room-temperature aging step, with the inclusion of a minor amount of faujasite in the reaction mixture to serve as a seed for the crystal formation. This variation in procedure enables a shortening of the overall processing time. The product obtained was eminently satisfactory, both from the standpoint of silica/alumina ratio and percent crystallinity.

The high silica faujasite prepared in accordance with the invention has great utility, both in laboratory procedures such as gas chromatography, and in industrial applications, such as a catalyst, particularly as a hydrocarbon cracking catalyst; as a desiccant, and as molecular sieve for liquid separations and as a carrier for various chemical species.

It will be understood that while I have explained the invention with the aid of numerous specific examples, nevertheless considerable variation is possible in choice of raw materials, processing conditions, and the like, within the broad scope of the invention as set forth in the claims which follow:

Having described the invention, I claim:

1. In a process for producing high silica faujasite having a silica-to-alumina mol ratio of at least 3.5, the steps which include:
   (a) leaching a metakaolin clay with an aqueous solution of an acid so as to produce a clay having a silica-to-alumina mol ratio within the range of about 4 to about 10;
   (b) washing said acid-leached clay until substantially free of acid;
   (c) commingling at a temperature not in excess of about 40° C. said washed clay with water and sodium hydroxide and fluoride ion so as to form a reaction mixture in which the components have relative mol proportions within the following approximate limits:

$Na_2O/Al_2O_3$: 1.6 to 8
   $SiO_2/Al_2O_3$: 4 to 10
   $H_2O/Al_2O_3$: 24 to 185
   $F/SiO_2$: Up to about 0.2 and in which said fluoride ion is present in an amount at least sufficient to increase the silica-to-alumina ratio of said faujasite to a value higher than in the absence of said fluoride;
   (d) maintaining said reaction mixture at a temperature within the range of about 20° C. to about 35° C. for a period up to about 48 hours;
   (e) thereafter heating said reaction mixture to a temperature within the range of about 80° C. to about 105° C. until the desired degree of formation of faujasite has taken plcae; and
   (f) thereafter recovering said faujasite from said reaction mixture.

2. The process in accordance with claim 1 in which said period is at least 18 hours.

3. The process in accordance with claim 1 wherein the step of maintaining said reaction mixture at a temperature within the range of about 20° C. and about 35° C. is omitted, and wherein high silica faujasite is included in said reaction mixture to the extent of at least 0.1% by weight.

4. The process in accordance with claim 1 wherein high silica faujasite is commingled with said reaction mixture to the extent of up to about 5% by weight of total solids therein.

5. In a process for producing high silica faujasite having a silica-to-alumina mol ratio of at least 3.5, the steps which include:
   (a) leaching a metakaolin clay with an aqueous solution of an acid so as to produce a clay having a silica-to-alumina mol ratio within the range of about 10 to about 50;
   (b) adding an alkali which forms a water-soluble salt with said acid to the clay-acid leach mixture thus formed so as to raise the pH thereof sufficiently high to produce a resulting clay having a silica-to-alumina mol ratio within the range of about 4 to about 10;
   (c) washing said resulting clay until substantially free of acid;
   (d) commingling said washed clay with water and sodium hydroxide so as to form a reaction mixture in which the components have relative mol proportions within the following approximate limits:

$Na_2O/Al_2O_3$: 1.6 to 6
   $SiO_2/Al_2O_3$: 4 to 10
   $H_2O/Al_2O_3$: 24 to 185

(e) maintaining said reaction mixture at a temperature within the range of about 20° C. to about 35° C. for a period up to about 48 hours;
   (f) thereafter heating said reaction mixture to a temperature within the range of about 80° C. to about 105° C. until the desired degree of formation of faujasite has taken place; and
   (g) thereafter recovering said faujasite from said reaction mixture.

6. The process in accordance with claim 5 in which said period is at least 18 hours.

7. The process in accordance with claim 5 wherein the step of maintaining said reaction mixture at a temperature within the range of about 20° C. and about 35° C. is omitted, and wherein high silica faujasite is included in said reaction mixture to the extent of at least 0.1% by weight.

8. The process in accordance with claim 5 wherein fluoride ion is commingled with said reaction mixture so as to give a mol ratio for $F/SiO_2$ of up to about 0.2 and at least sufficient to increase the silica-alumina ratio of said product to a value higher than in the absence of said fluoride.

9. The process in accordance with claim 8 wherein high silica faujasite is commingled with said reaction mixture to the extent of up to about 5% by weight of total solids therein.

10. The process in accordance with claim 9 wherein said metakaolin is delaminated metakaolin.

11. The process in accordance with claim 5 wherein said acid is sulfuric and said alkali is sodium hydroxide.

12. The process in accordance with claim 8 wherein said alkali is sodium hydroxide.

References Cited

UNITED STATES PATENTS

| | | | |
|---|---|---|---|
| 2,979,381 | 4/1961 | Gottstine et al. | 423—329 |
| 3,119,660 | 1/1964 | Howell | 423—118 |
| 3,227,660 | 1/1966 | Hansford | 252—455 |
| 3,321,272 | 5/1967 | Kerr | 423—329 |
| 3,343,913 | 9/1967 | Bobson | 423—329 |
| 3,390,958 | 7/1968 | Howell | 423—118 |
| 3,393,045 | 7/1968 | Maher | 423—118 |

EDWARD J. MEROS, Primary Examiner

U.S. Cl. X.R.

252—455 Z